United States Patent [19]
Buesing

[11] Patent Number: 5,755,155
[45] Date of Patent: May 26, 1998

[54] ASEPTIC PROCESS INTERFACE GROUP

[75] Inventor: Jonathan P. Buesing, Maplewood, Minn.

[73] Assignee: Tetra Laval Holdings & Finance S.A., Pully, Switzerland

[21] Appl. No.: 810,613

[22] Filed: Feb. 28, 1997

[51] Int. Cl.⁶ .................... A01J 5/00; A01J 7/00; A01J 7/02; A23C 3/02
[52] U.S. Cl. .................... 99/453; 99/452; 134/18; 134/61; 137/240; 137/597
[58] Field of Search .................... 99/468, 452–460, 99/486–489, 516, 534–536, 352–355; 134/3, 11, 13, 18, 22.13, 25.1, 25.2, 26, 31, 36, 42, 29, 40, 57 R, 56 D, 61, 120, 159, 163, 168 R, 901; 426/512–515; 137/240, 597, 606, 312, 637.2

[56] References Cited

U.S. PATENT DOCUMENTS

| | | | |
|---|---|---|---|
| 3,799,220 | 3/1974 | Berry et al. | 99/453 X |
| 4,113,890 | 9/1978 | Long | 99/355 X |
| 4,199,268 | 4/1980 | Parzych | 99/461 X |
| 4,281,683 | 8/1981 | Hetherington et al. | 137/606 |
| 4,334,881 | 6/1982 | Reinert et al. | 134/18 X |
| 4,579,676 | 4/1986 | Bull | 134/40 X |
| 4,848,381 | 7/1989 | Livingston et al. | 134/57 R |
| 4,874,021 | 10/1989 | Ringdahl et al. | 141/85 |
| 4,876,100 | 10/1989 | Holm et al. | 99/452 |
| 4,913,185 | 4/1990 | Mattei | 137/241 |
| 4,957,133 | 9/1990 | Linz et al. | 137/240 |
| 5,203,359 | 4/1993 | Fesmire et al. | 134/61 |
| 5,226,449 | 7/1993 | Zimmerly | 137/597 |
| 5,232,023 | 8/1993 | Zimmerly | 137/637.2 |
| 5,390,694 | 2/1995 | Zimmerly et al. | 137/240 |
| 5,469,880 | 11/1995 | Zimmerly | 137/240 |
| 5,509,349 | 4/1996 | Anderson et al. | 99/452 X |
| 5,522,307 | 6/1996 | Kersten et al. | 99/470 X |
| 5,556,481 | 9/1996 | Baguet | 134/901 |
| 5,562,829 | 10/1996 | Malcolm et al. | 134/13 |
| 5,669,983 | 9/1997 | Cooper et al. | 134/18 |

OTHER PUBLICATIONS

Intl. Assoc. of Milk, Food and Env. Sanitarians, U.S. Pub. Health Ser. The Dairy Ind. Committee, *3–A Accepted Practices For Permanently Installed Product And Solution Pipelines and Cleaning Systems Used In Milk and Milk Product Processing Plants, No. 605–04*, Dairy, Food and Env. Sanitation, vol. 12, No. 2, Feb. 1992, pp. 1–6.

*Primary Examiner*—Timothy F. Simone
*Attorney, Agent, or Firm*—Michael A. Catania

[57] ABSTRACT

An interface between an aseptic or pasteurized product supply vessel, one or more product dispensing machines, and a cleaning liquid supply vessel is disclosed. The interface can be used for directing milk and other foods from a process line to a packaging or other machine. In one variation, the interface has first and second spaced liquid supply valves, arranged in series, between the cleaning liquid inlet and the product dispensing machine outlet. The piping between the two valves can be drained, and optionally filled with steam or other sterilizing fluid, to provide a barrier between the cleaning fluid upstream of one valve and the food located downstream of the other valve which is en route to the packaging machine. In another variation, the interface has a product supply valve, a drain isolation valve, a drain between those two valves and itself controlled by a drain valve, and a cleaning liquid supply valve. The interface is versatile, and can be used for meeting the 3A standard for pasteurized dairy products, as well as the different standards for aseptic and near-aseptic packaging.

21 Claims, 12 Drawing Sheets

ASEPTIC PROCESS INTERFACE GROUP

CROSS-REFERENCE TO RELATED APPLICATIONS

Not applicable.

STATEMENT REGARDING FEDERALLY SPONSORED RESEARCH OR DEVELOPMENT

Not Applicable.

BACKGROUND OF THE INVENTION

The present disclosure relates generally to a series of valves for routing two or more fluids through a piping system while maintaining isolation between the fluids. The disclosure relates more particularly to such a system for routing a pasteurized, aseptic, or near-aseptic material (for example, milk or other food) from a source to a package filling machine, and for periodically routing at least one cleaning-in-place fluid from a source to the piping system and package filling machine.

Aseptic (or sanitary or sterile) packaging of milk, other foods, and other products requires that the food must be initially sterilized or otherwise treated, as by pasteurizing it. Then, throughout the packaging operation, the food must be kept sanitary. Care must be taken to ensure that the food is not contaminated with cleaning fluids, lubricants, ambient air, or unsterile matter. If the food is not aseptic (for example, properly-handled conventionally pasteurized milk is not aseptic), stringent steps must be taken to avoid trapping the food in any crevice, pocket, dead end or mechanism, as entrapped food which is not aseptic when it enters may sustain microbial growth and may form unsightly lumps or particles. This machinery must be designed to facilitate regular inspection of any mechanism which might deteriorate and thus trap the food or expose it to contaminants. As stopping such machinery for any extended time generally compromises the sanitary status of the food, each time a packaging machine is stopped for a substantial time it must be cleaned and sanitized before resuming production.

The industry has developed ways to maintain packaging machinery in sanitized condition while minimizing the need to disassemble it for cleaning. For example, the United States government and the dairy industry have worked together to define standards for maintaining permanently installed piping in milk processing plants and the like in sanitary condition by cleaned-in-place (CIP) or mechanical cleaning. See 3A *Accepted Practices For Permanently Installed Product And Solution Pipelines And Cleaning Systems Used In Milk And Milk Product Processing Plants*, Number 605-04, DAIRY, FOOD AND ENVIRONMENTAL SANITATION, Vol. 12, No. 2 (February, 1992). In CIP cleaning, the milk distribution mechanism is cleaned and sanitized solely by circulating cleaning or sanitizing fluids (such as water, detergent solutions, acid or caustic solutions, other chemicals, or steam) through the piping as required. Apparatus meeting the 3A standard is very desirable, as it can be efficiently used, cleaned and kept sanitary, even though the pasteurized milk being processed is not aseptic and remains perishable.

Block-and-bleed valve assemblies, also known as "leak detector" valves, have been used to ensure that two process streams, like a sanitary product and a cleaning fluid which are to flow alternately through the same piping, do not mix, either during normal operation or due to leakage or other failure of a single valve. Two valves are provided in series in a block-and-bleed valve. The inlet valve is located at the inlet to the valve chamber, and is normally closed to stop the flow of one of the fluids into the chamber. The outlet valve is located at the outlet to the valve chamber, and is normally closed to stop the flow (usually, unintended backflow) of the other of the fluids into the valve chamber. A normally-open drain in the valve chamber, which is also valved, facilitates leak detection. For example, the drain tube leaving the valve can be transparent so any leakage into the drain can be seen. This valve arrangement is required by the 3A standard, which additionally requires that the drain line must have the same diameter as the smaller of the respective inlet lines running to the valve.

Several problems must be solved before the 3A standard can be met. The apparatus must be capable of routing cleaning and sanitizing fluids and the product through the same lines, at different times, without allowing contact or only single-valve separation between the supply of food and any other fluid.

Even if separation of two fluids by a single valve seat is allowed by the applicable standard, as when the fluids are an aseptic product and steam, such single-valve separation is often undesirable for other reasons. For example, if steam is on one side of a valve and aseptic milk is on the other, the heat from the steam may cook the milk and leave a solid deposit or residue on the valve or in the adjacent pipe.

A particular problem in meeting the 3A standard is presented by large packaging operations in which several high-speed packaging stations are fed from one process line. This situation is common because a packaging operation is commonly slower, more mechanically complex, and less continuous than the preceding processing operations (such as pasteurization or other sanitizing of milk, for one example). For various reasons, one of the packaging machines may be shut down while others continue to run—for example, to service or repair it. The food processor needs to re-clean, re-sterilize, and then re-start the dormant machine as soon as possible to return it to service, without interrupting packaging by the remaining machines. A series of packaging machines may be designed so they can be shut down at different times, so the remaining machines continue to operate while the machines are successively serviced.

To allow separate cleaning and sanitizing of one machine while others continue to package food from the same supply, the machine manufacturer must provide a special interface or connection between the food supply line and each packaging machine.

Much of the previously-developed sanitary or aseptic packaging equipment does not comply with the 3A standard, and thus is undesirably costly and difficult to use and maintain.

Another difficulty with existing interfaces is that there are several different sanitizing standards for different materials, such as aseptic standards, near-aseptic standards, and the 3A standard for pasteurized milk. It would be desirable to have packaging or other machinery which can be operated under different standards. Unfortunately, much or all of the equipment available today is designed to operate under a specific standard, and must be rebuilt if it is to be operated under a different standard.

BRIEF SUMMARY OF THE INVENTION

The presently disclosed machine is an interface between a sanitized product supply vessel, one or more product dispensing machines, and a cleaning liquid supply vessel. The interface includes a product inlet, a product dispensing machine outlet, and a cleaning liquid inlet.

The product inlet can be connected to a sanitary product supply vessel to receive a supply of the sanitary product. The product dispensing machine outlet can be connected to the product dispensing machine. The cleaning liquid inlet can be connected to the cleaning liquid supply vessel for cleaning the interface piping.

In one variation, the interface has first and second spaced liquid supply valves, arranged in series, between the cleaning liquid inlet and the product dispensing machine outlet. The piping between the two valves can be drained, and optionally filled with steam or other sanitizing fluid, to provide a barrier between the cleaning fluid upstream of one valve and the sanitary product located downstream of the other valve which is en route to the packaging machine.

In another variation, the interface has a product supply valve, a drain isolation valve, a drain between those two valves and itself controlled by a drain valve, and a cleaning liquid supply valve.

The product supply valve has an inlet normally communicating with the product inlet and a outlet. The drain valve has an inlet communicating with the outlet of the product supply valve and an outlet communicating with the drain. The drain isolation valve has an inlet communicating with the outlet of the product supply valve and a outlet communicating with the product dispensing machine outlet. The cleaning liquid supply valve has an inlet communicating with a supply of the cleaning liquid and an outlet located between and communicating with the outlet of the drain isolation valve and the product dispensing machine outlet.

The present interface has several desirable features. For example, the valves can be arranged and operated to provide at least single-valve isolation at all times between the plant process line cleaning fluid and the machine cleaning fluid. The valves can be arranged to provide at least two valves in series between the lines containing an food product which is suitable for packaging and the machine's cleaning fluid, with an open drain between the two valves.

As another desirable feature, a steam-filled buffer—two valves with intermediate steam isolation—can be provided between any other fluid and the product when the product is flowing to the packaging machine. The pressure of steam in the buffer can optionally be slightly greater than the pressure of the cleaning fluid and slightly less than the pressure of the product. Any leakage in the cleaning liquid valve will result in an outflow of steam from the buffer, rather than an inflow of cleaning liquid to the buffer. Any leakage in the product valve will result in flow of the product into the steam buffer, instead of flow of any matter from the steam buffer to the product supply.

Another advantage of the present machine is that it is versatile, and can meet either the aseptic processing standards requiring steam buffers or the 3A standard requiring "block and bleed" valve assemblies with drains, at the option of the operator.

BRIEF DESCRIPTION OF DRAWING FIGURES

Identical reference characters for different views indicate like or corresponding parts.

DETAILED DESCRIPTION OF THE INVENTION

While the invention will be described in connection with one or more preferred embodiments, it will be understood that the invention is not limited to those embodiments. On the contrary, the invention includes all alternatives, modifications, and equivalents as may be included within the spirit and scope of the appended claims.

The term "sanitary" used herein is used broadly with reference to material which is sanitary, near-aseptic, or aseptic, unless a specific distinction is made. The term "food" is used as one nonexclusive example of material which is prepared or packaged under sanitary conditions. The present apparatus is also suitable for processing orally and non-orally administered pharmaceutical preparations or any other material which is perishable or may cause processing difficulties if it is allowed to accumulate in the apparatus or support microbial growth.

Figure 1:
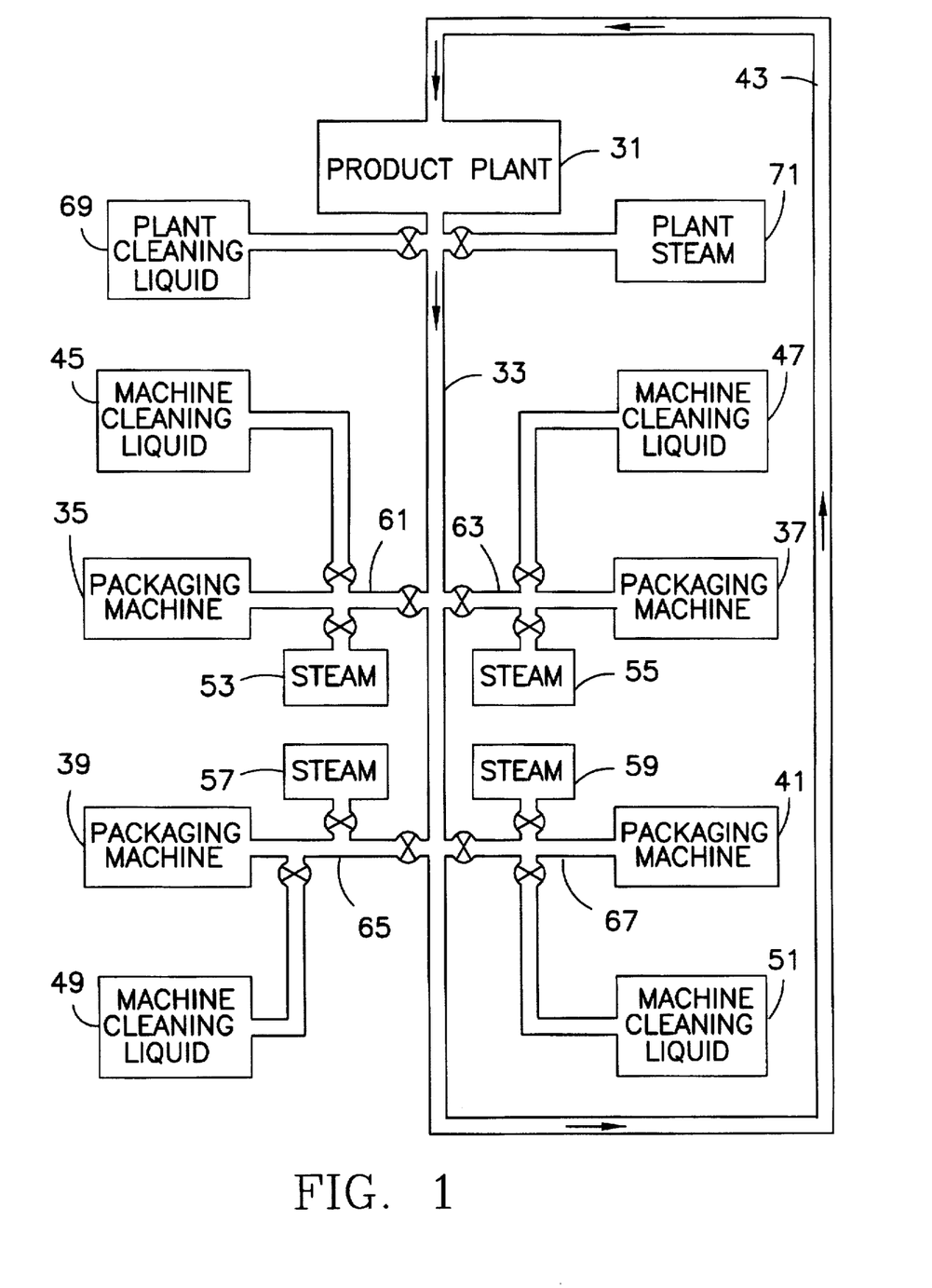
FIG. 1 is a schematic view of a food product production and packaging plant feeding four packaging machines from a single process line via four interfaces. Each interface interrelates the process line with one of the packaging machines and its cleaning fluid and steam supplies.

FIG. 1 shows the environment of the present interface. The product plant 31 is broadly any source of material to be packaged or otherwise dispensed. For example, the plant 31 may be a sterilizing process plant for providing an food liquid product such as milk destined for human consumption. The product to be packaged leaves the product plant 31 via a supply vessel or process line 33 which feeds several (here, four) product dispensing machines 35, 37, 39, and 41. Any remaining product which is suitable for use can be recycled to the product plant 31 via the recycle line 43. The product dispensing machines 35, 37, 39, and 41 can take a variety of different forms and accomplish a variety of different functions. One exemplary type of machine, illustrated here, is a packaging machine to divide a process stream into small, discrete packages.

Each illustrated packaging machine 45, 47, 49, and 51 has an independent source (respectively denoted as 45, 47, 49, and 51) of one or more cleaning liquids, as well as an independent source (respectively denoted as 53, 55, 57, and 59) of one or more sterilizing fluids. The number, choice, and nature of these cleaning and sterilizing fluids is not critical. One of the fluids, however, is desirably steam in one embodiment.

The four interfaces 61, 63, 65, and 67 are branch lines which interface between or connect the process line 33 and the machines 35, 37, 39, and 41 to distribute the product. The interfaces 61, 63, 65, and 67 also connect to the cleaning and sterilizing fluid sources 45, 47, 49, 51, 53, 55, 57, and 59, and connect those fluid sources to the packaging machines 35, 37, 39, and 41 when it is necessary to clean and sterilize the interfaces and packaging machines.

The product plant 31 of FIG. 1 also has its own source 69 of cleaning fluid and source 71 of sterilizing fluid, which are used to clean and sterilize the process line 33.

One typical requirement for operating the apparatus of FIG. 1 is that the plant cleaning and sterilizing fluids should not come into contact with the machine cleaning and sterilizing fluids at any time. These respective fluids are always separated by a series of at least two valves in the present food packaging line. Also, the food or other product and the cleaning liquids are always separated by a series of at least two valves in the present packaging line. Yet, every part of the system which is in contact with the product at any time must first be cleaned and sanitized by contact with the cleaning fluids.

In this embodiment, each interface 61, 63, 65, and 67 has a series of valves, best shown in later figures, which can be operated to create a movable, ever-present buffer between the food, the machine cleaning and sanitizing fluids, and the process line cleaning and sanitizing fluids. As will become apparent, any single packaging machine shown in FIG. 1 can be taken out of service, cleaned and sterilized, and returned to service without affecting flow through the process line 33 or the other machines and without compromising the integrity of the product anywhere in the system. One key to the versatility of this system is the construction of the interfaces 61, 63, 65, and 67.

Figure 2:
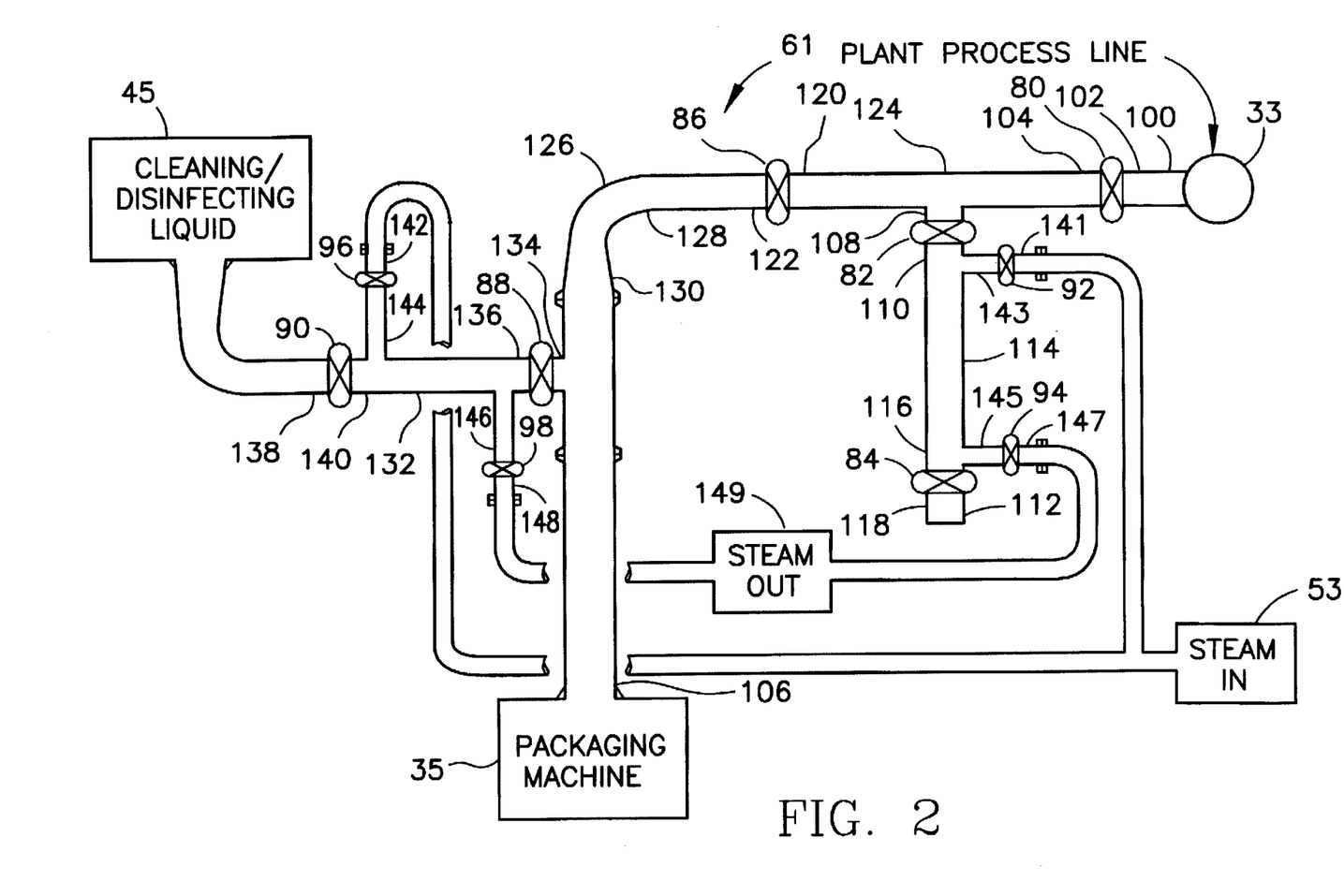
FIG. 2 is a more detailed schematic side elevation of one of the interfaces of FIG. 1.

FIG. 2 is a more detailed, schematic side elevation of the interface 61 between the process line 33, the packaging machine 35, and the cleaning fluid and steam supplies 45 and 53. The illustrated interface 61 has ten valves, identified by reference characters 80–98. The valves 80, 82, 84, 86, 88, and 90 are food, self-draining, diaphragm shut-off valves which are rated to pass or contain food liquids and cleaning liquids and to at least contain steam at sterilizing pressures and temperatures. The valves 92 and 96 are steam inlet valves, and the valves 94 and 98 are steam/condensate drain valves which restrict steam flow at the outlet and drain condensate.

As used herein, particularly for the valves 80–90, the "inlet" or "outlet" are each broadly and non-literally defined, as fluids flow in both directions through many of the valves in the interface 61 at various times. For convenience, the sides of the valves 80, 82, 84, and 86 at which the food product flowing from the process line 33 normally enters are defined as the inlets of those valves, while the sides of the valves 88 and 90 at which the cleaning liquid flowing from the source 45 normally enters are defined as the inlets of those valves. Also, "upstream" and "downstream" are defined at any time with respect to the flow of a particular fluid. Different fluids, or even a particular fluid at different times, flow in different directions. Further, one structure which is "adapted to communicate" or "for communicating" with another is defined in this specification and the claims as one which can communicate with the other, assuming any valves between them are opened. The insertion of an additional valve, vessel, tank, etc., between two structures does not prevent them from being "adapted to communicate" or "for communicating" as defined here. Still further, the present specification identifies "at least one" of many structures, of which only one is shown in the particular embodiments described in the specification and drawings. Two, three, four, or more of each of these structures, arranged in series or parallel, are specifically contemplated as alternative embodiments.

Returning to FIG. 2, the interface 61 has at least one product inlet 100 adapted to communicate with at least one food product supply vessel (here the plant process line 33) to receive at least one supply of the food product. The valve 80 is at least one product supply valve having at least one inlet 102 for communicating with said product inlet and at least one outlet 104 for communicating with the product dispensing machine outlet 106. The product inlet 102 is preferably slanted sufficiently toward the process line 33 to drain its entire contents into the process line 33 when the valve 80 is closed.

The valve 82 is at least one drain valve having at least one inlet 108 for communicating with the outlet of the product supply valve 80 and at least one outlet 110 for communicating with the drain 112, here via a drain line 114. The valve 84 is another drain line valve placed in series with the valve 82 and having at least one inlet 116 for communicating with the drain line 114 and at least one outlet 118 for communicating with the drain 112. An isolation space is defined between the valves 82 and 84.

The valve 86 is at least one isolation valve having at least one inlet 120 for communicating with the outlet 104 of the product supply valve 80 and at least one outlet 122 for communicating with the product dispensing machine outlet 106. The tee 124 defines an open common space between the valves 80, 82, and 86. The arms of the tee 124 can be slanted toward their junction sufficiently to drain its entire contents to the inlet 108 of the valve 82 when the valves 82 and 84 are open, so the tee 124 can drain completely when it is not in use. For compactness the tee 124 can be collapsed so it is merely the junction between the valve outlet 104 and the valve inlets 108 and 120.

The elbow 126 has a first run 128 which is slanted away from the outlet 122 and a second run 130 which communicates with the first run 128 and the product dispensing machine outlet 106. This again is self-draining construction.

The second run 130 has a cleaning liquid inlet or branch 132 for supplying cleaning liquid from the source 45 to the interface 61 and, in this embodiment, the packaging machine 35. Separate supplies of cleaning liquid could also be supplied for the interface 61 and the machine 35, by providing a different arrangement. The branch 132 has an outlet defined by the outlet 134 of at least one first cleaning liquid supply valve 88 for communicating with the product dispensing machine outlet 106. The valve 88 also has at least one inlet 136.

The branch 132 also has at least one second cleaning liquid supply valve 90 having at least one inlet 138 for communicating with the cleaning liquid source 45 and at least one outlet 140 for communicating with the inlet 136 of the first cleaning liquid supply valve 88.

The valves 92 and 96 are steam inlet valves having inlets 141 and 142 connected by suitable piping to the steam source 53. The outlets 143 and 144 of the valves 92 and 96 communicate with the drain line 114 and the branch line 132, respectively. The valves 94 and 98 are steam drain valves having inlets 145 and 146 communicating with the drain line 114 and the branch line 132, respectively. The outlets 147 and 148 of the valves 94 and 98 communicate with the condensate drain 149.

Refer now to FIGS. 3–12, which show the interface of FIG. 2 in various states of operation.

Figure 3:
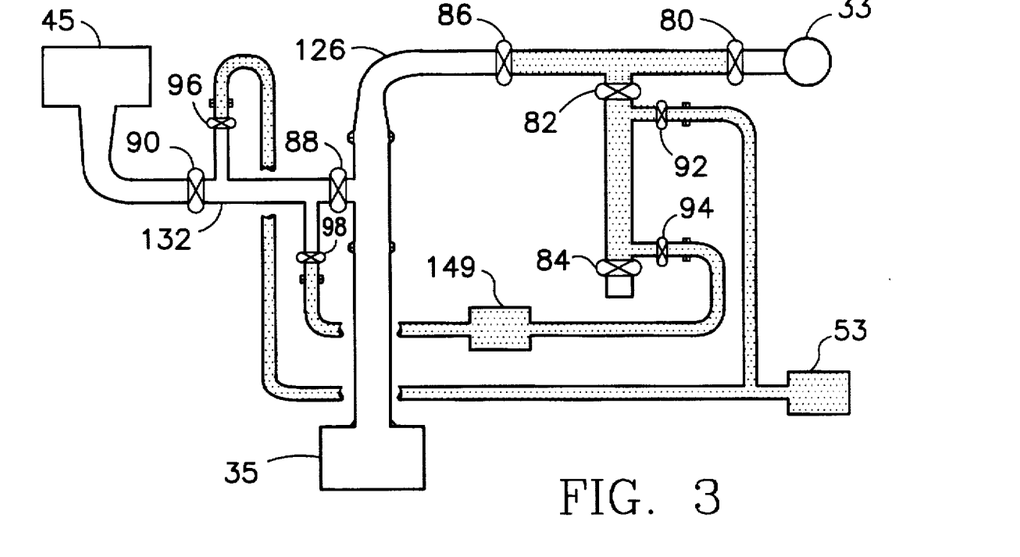
FIG. 3 is a view similar to FIG. 2, showing the valve positions and fluids present in the interface in a first state of the interface.

FIG. 3 is a view similar to FIG. 2, showing the valve positions and fluids present in the interface in "Position 1." This and other position numbers do not indicate precedence or a sequence of operations, but are merely different names for the different states of the interface 61.

In Position 1, shown in FIG. 3, the valves 82, 92, and 94 are open, and the valves 80, 84, 86, 88, 90, 96, and 98 are closed. The branch 132 and the elbow 126 are empty. The tee 124 between the valves 80, 84, and 86 is full of steam which is entering at the valve 92 while condensate is drained at the valve 94. In Position 1, no product is present in the process line 33, the packaging machine 35 is dormant, and the process line 33 is isolated from the cleaning liquid supply 45 and the packaging machine 35 by a steam buffer between two closed valves (80 and 86) in series. The left end of the branch 132 may optionally be open to ambient air in Position 1. Position 1 can be used, for example, when the process line 33 and the packaging machines 35–41 are all shut down and cleaned but it is desired to maintain a sterile buffer between any source of ambient air and the process line 33.

Figure 4:
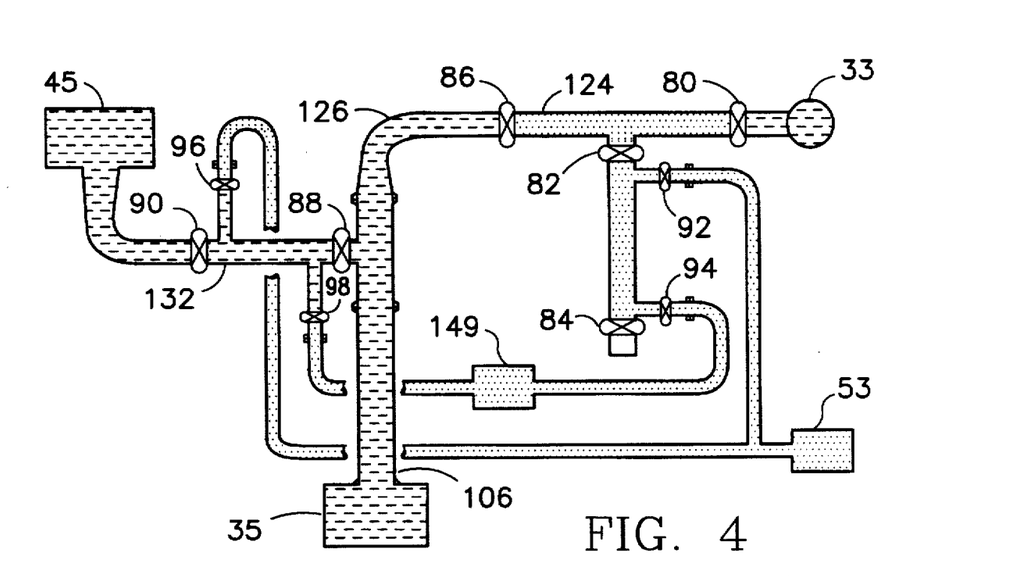
FIG. 4 is a view similar to FIG. 2, showing the valve positions and fluids present in the interface in a second state of the interface.

FIG. 4 shows the valve positions and fluids present in the interface in Position 2. In FIG. 4 the valves 82, 88, 90, 92, and 94 are open, and the valves 80, 84, 86, 96, and 98 are closed. The branch 132 and the elbow 126 are full of a cleaning liquid from the supply 45; the cleaning liquid is also flowing through the product dispensing machine outlet 106 to clean the packaging machine 35. The tee 124 between the valves 80, 84, and 86 is full of steam which is entering at the valve 92 while condensate is drained at the valve 94. In Position 2, the product is present in the process line 33. Position 2 is used to clean the packaging machine 35 while maintaining two valves (86 and 80) in series and a sterile steam buffer between the cleaning liquid and the product in the process line 33. Referring to FIG. 1, the machine 35 can be cleaned while the machines 37, 39, and 41 are packaging the product from the process line 33. FIG. 4 is acceptable for aseptic packaging, particularly when the product is such that the steam buffer in the tee 124 will not tend to cook the contents of the process line 33 at the valve 80.

Figure 5:
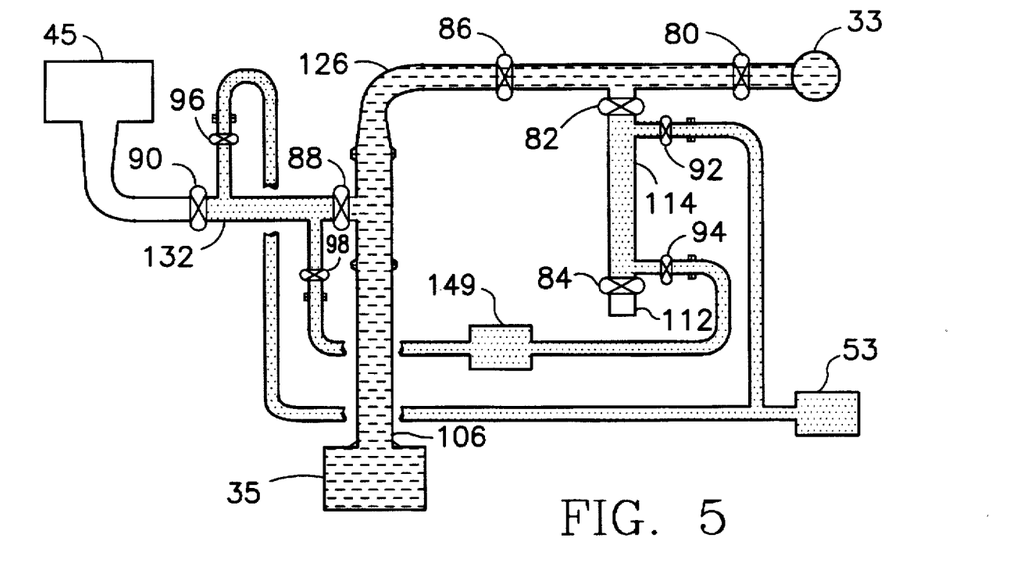
FIG. 5 is a view similar to FIG. 2, showing the valve positions and fluids present in the interface in a third state of the interface.

FIG. 5 is a view similar to FIG. 2, showing the valve positions and fluids present in the interface in Position 3. In FIG. 5 the valves 80, 86, 92, 94, 96, and 98 are open, and the valves 82, 84, 88, and 90 are closed. The portion of the branch 132 to the left of the valve 90 is empty, while the remainder of the branch 132 is full of steam which is entering at the valve 96 while condensate is drained at the valve 98. An open path from the process line 33 through the elbow 126 allows a continuous flow of the product to the machine 35 for packaging. The drain line 114 is full of steam which is entering at the valve 92 while condensate is drained at the valve 94. This configuration is useful for conveying the product to the machine 35 while maintaining one steam barrier between the empty part of the branch line 132 and the product in the elbow 126 and another steam barrier between the drain 112 and the product in the line between the valves 80 and 86. Again, this is an aseptic interface, as opposed to a 3A interface which does not juxtapose steam and the product across a single valve.

The configuration of FIG. 5 can also be used when steam is an undesirable buffer, as when the product across a single valve from the steam is subject to undesirable cooking (for example, egg products, which harden and form deposits when heated). The steam can be replaced by sterilized air. This substitution can be made, for example, by shutting off the steam source 53 remotely from the valves 92 and 96, then filling up the steam conduits with sterilized air. This sterilized air can then be introduced through the valves 92 and 96 and acts as a buffer. The sterilized air can be cool enough, or transmit heat slowly enough, to avoid cooking the product passing by the valve 82 en route to the packaging machine 35.

Position 3 is also useful for another purpose. The plant process line 33 commonly is regularly cleaned and sterilized in place, using the plant cleaning liquid source 69 and the plant source of sterilizing fluid 71 (shown in FIG. 1). Under certain circumstances, the operator may want to sterilize one or all of the machines 35, 37, 39, and 41 while sterilizing the process line 33, using the plant cleaning or disinfecting chemicals from the sources 69 and 71. This is done with the same valve settings, but running the cleaning or sterilizing fluid from the process line 33 through the valves 80 and 86, the elbow 126, and the product dispensing machine outlet 106 into at least the machine 35, and optionally all the machines. This procedure might be used, for example, when the entire system is started up for the day. Yet, as will become apparent, it is not necessary to use the plant supplies of steam and chemicals to sterilize the machines 35–41. This is just another option afforded to the machine operator by the present interface 61.

Figure 6:
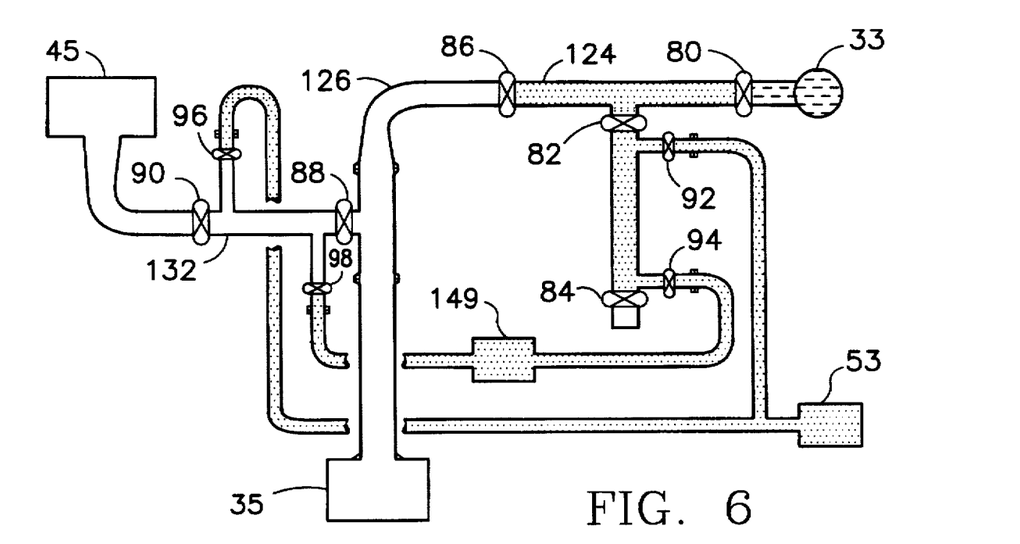
FIG. 6 is a view similar to FIG. 2, showing the valve positions and fluids present in the interface in a fourth state of the interface.

FIG. 6 is a view similar to FIG. 2, showing the valve positions and fluids present in the interface in Position 4. In FIG. 6, like FIG. 4, the valves 82, 88, 90, 92, and 94 are open, and the valves 80, 84, 86, 96, and 98 are closed. The branch 132 and the elbow 126 are empty, and may be exposed to ambient air. The tee 124 between the valves 80, 84, and 86 is full of steam which is entering at the valve 92 while condensate is drained at the valve 94. In Position 4 the product is present in the process line 33. This arrangement can be used to provide a steam buffer and two valves in series (80 and 86, or 80 and 84) between the product in the process line 33 and the drain 112 or the empty elbow 126. This arrangement of FIG. 6 provides a high level of protection for the product in the process line 33 while an individual packaging machine 35 is not operating.

Figure 7:
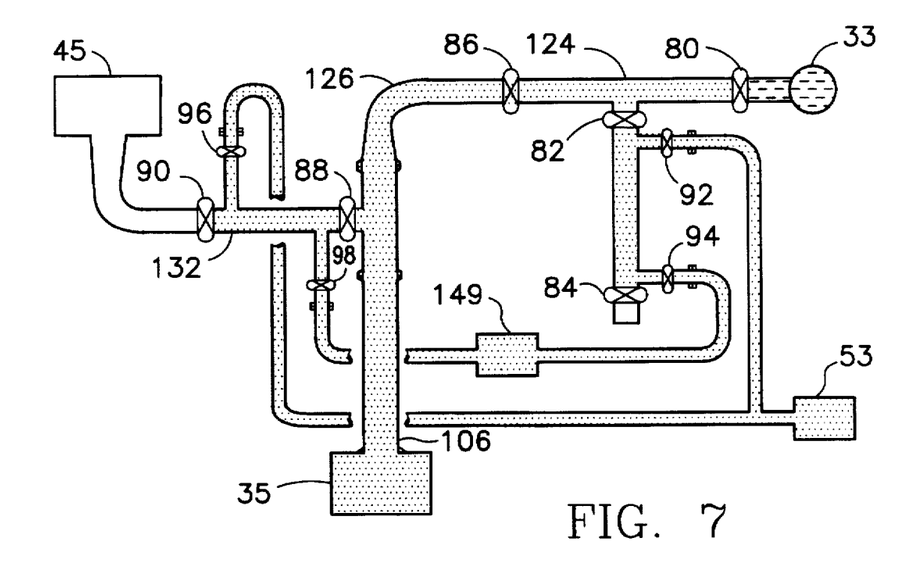
FIG. 7 is a view similar to FIG. 2, showing the valve positions and fluids present in the interface in a fifth state of the interface.

FIG. 7 is a view similar to FIG. 2, showing the valve positions and fluids present in the interface in Position 5. In FIG. 7 the valves 82, 86, 88, 92, 94, 96, and 98 are open, and the valves 80, 84, and 90 are closed. The branch 132 is empty and potentially contains ambient air to the left of the valve 90. The remainder of the branch 132, the elbow 126, and the tee 124 between the valves 80, 84, and 86 are full of steam which is entering at the valves 92 and 96 while condensate is drained at the valves 94 and 98. Steam is also flowing through the product dispensing machine outlet 106 to the machine 35. The entire filling system between the valves 80 and 90 is thus being sanitized. At the same time, in Position 5 the product may be present in the process line 33.

Figure 8:
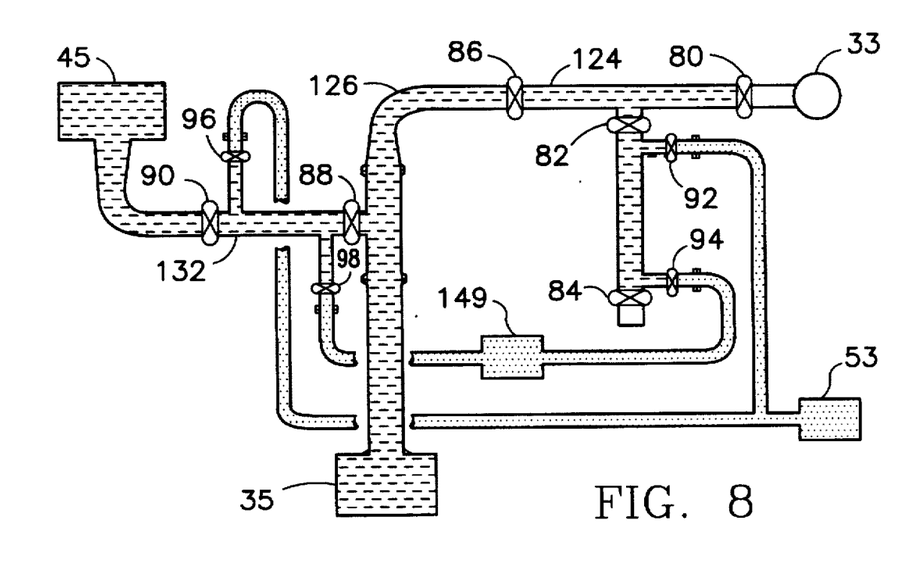
FIG. 8 is a view similar to FIG. 2, showing the valve positions and fluids present in the interface in a sixth state of the interface.

FIG. 8 is a view similar to FIG. 2, showing the valve positions and fluids present in the interface in Position 6. In FIG. 8 the valves 82, 86, 88, and 90 are open, and the valves 80, 84, 92, 94, 96, 98 are closed. The branch 132, the elbow 126, and the tee 124 between the valves 80, 84, and 86 are full of the machine's cleaning liquid from the source 45. In Position 6, the product is not present in the process line 33.

Figure 9:
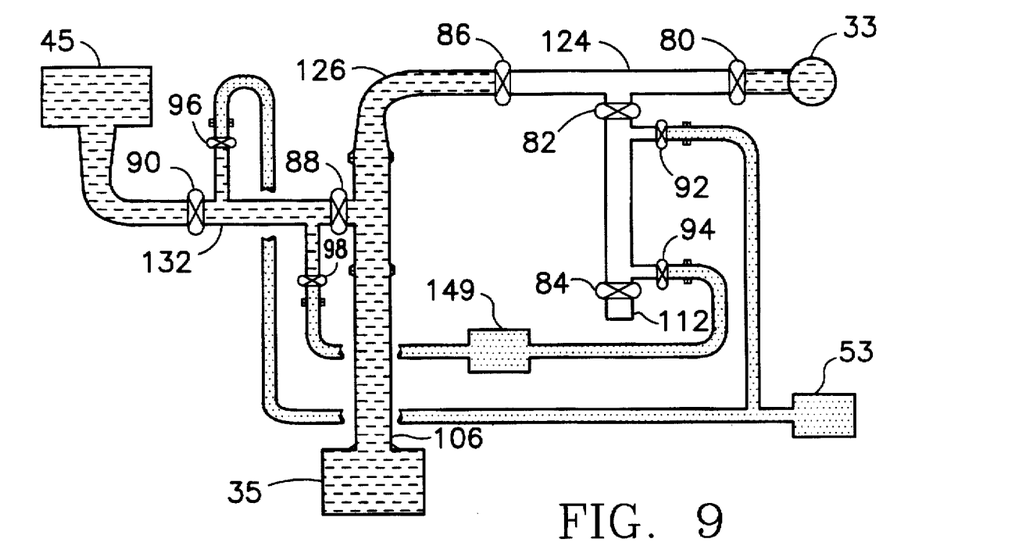
FIG. 9 is a view similar to FIG. 2, showing the valve positions and fluids present in the interface in a seventh state of the interface.

FIG. 9 is a view similar to FIG. 2, showing the valve positions and fluids present in the interface in Position 7. Position 7 is a new capability of this machine, not shared by certain prior art aseptic packaging machines which do not meet the 3A standard.

In FIG. 9 the valves 82, 84, 88, and 90 are open, and the valves 80, 86, 92, 94, 96, 98 are closed. The branch 132 and the elbow 126 are full of cleaning liquid from the source 45, and are feeding the cleaning liquid through the product dispensing machine outlet 106 to the packaging machine 35, thus cleaning the machine 35. The tee 124 between the valves 80, 84, and 86 is empty, and the drain 112 between the valves 80 and 86 is open, so any leakage of the valves 80 or 86 will be quickly evident. In Position 7, the product is present in the process line 33.

The arrangement of FIG. 9 meets the requirement of the 3A standard for an open drain between two valves in series separating cleaning fluids in one part of the apparatus from the product in another part of the apparatus.

Figure 10:
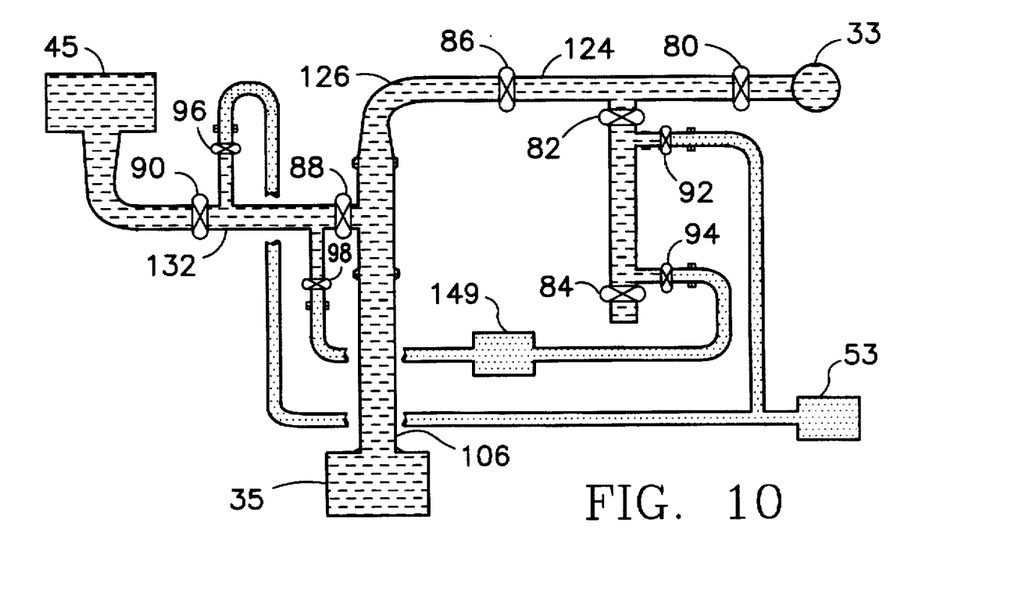
FIG. 10 is a view similar to FIG. 2, showing the valve positions and fluids present in the interface in a eighth state of the interface.

FIG. 10 is a view similar to FIG. 2, showing the valve positions and fluids present in the interface in Position 8. In FIG. 10 the valves 80, 82, 84, 88, and 90 are open, and the valves 86, 92, 94, 96, and 98 are closed. In one operating mode, the branch 132 and the elbow 126 are full of machine cleaning liquid from the source 45, which is also directed through the product dispensing machine outlet 106 to clean the machine 35. At the same time, the tee 124 between the valves 80, 84, and 86 is full of plant cleaning fluid from one of the sources 69 and 71, conveyed via the process line 33 through the valve 80.

Using this operating mode of FIG. 10, the seat and other working parts of the valve 80 can be efficiently cleaned by running cleaning fluid through the valve 80. Yet, a barrier (the valve 86, which is closed) is maintained between the plant cleaning chemicals and the machine 35 cleaning chemicals. This barrier can be a single barrier, as the 3A requirement for two valves in series with an open drain between them only applies to isolation of the product from other fluids. Still another advantage shown in FIG. 10 is that the machine cleaning liquid to the left of the valve 86 can completely drain through the product dispensing machine outlet 106, while the plant cleaning liquid to the right of the valve 86 can fully drain through the drain 112, without the two cleaning fluids ever meeting.

In the second mode of operating with the valves positioned as shown in FIG. 10, the fluids to the right of the valve 86 remain as in the first mode to clean the valve seat and parts of the valve 80, but the machine cleaning fluid is drained from the portion of the apparatus to the left of the valve 86. In one contemplated method, the machine 35 can be cleaned with the interface valves in Position 7 (FIG. 9) while maintaining two valves and an open drain between them in the tee 124. The machine can be cleaned with the liquid from the supply 45. Then the machine cleaning liquid is drained from the branch 132 and the elbow 126 through the outlet 106, leaving no cleaning fluid in the apparatus to the left of the valve 86 of FIG. 10. Finally, the valves 80 and 84 are opened and the tee 124 is cleaned after there is no cleaning liquid present at the left side of the valve 86.

In this second mode, after the branch 132 and elbow 126 are drained, at least two valves in series are left between the respective cleaning fluids for the machine 35 and the process line 33, providing extra assurance that one cleaning fluid will not contaminate or react with the other. Strong chemicals which may react with each other are sometimes used in the respective parts of the machine 35 and the process line 33. For example, strong acid may be used in one, and strong caustic may be used in the other. This can happen easily if the filling machines such as 35 are operated as their manufacturer advises, while the plant is operated under the advice of a different individual or company. If these two chemicals accidentally meet in any substantial quantity, an undesirable reaction may ensue. The present system allows more latitude for avoiding this possibility.

Figure 11:
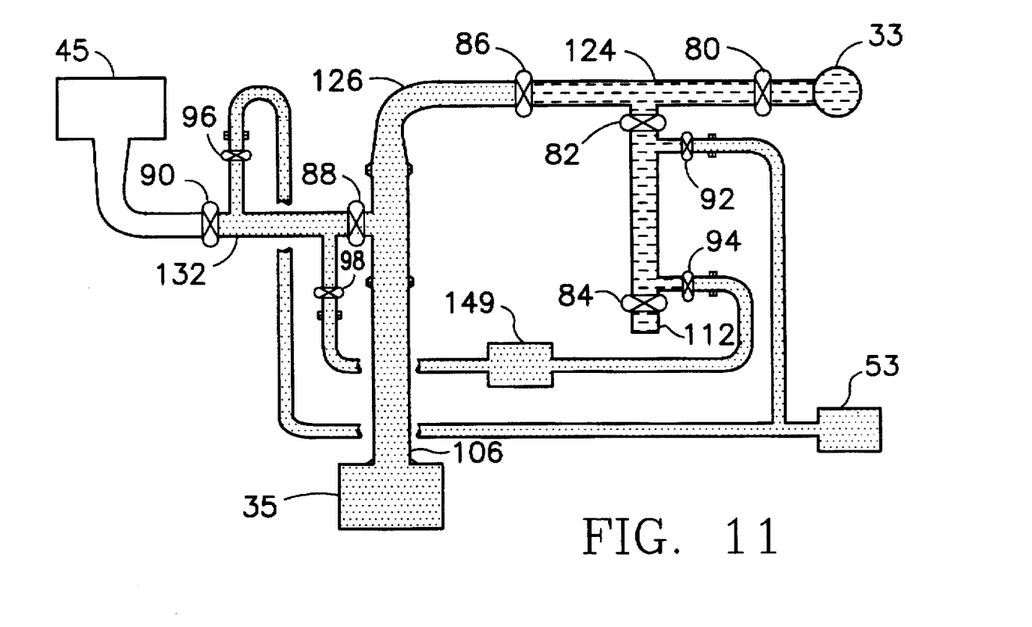
FIG. 11 is a view similar to FIG. 2, showing the valve positions and fluids present in the interface in a ninth state of the interface.

FIG. 11 is a view similar to FIG. 2, showing the valve positions and fluids present in the interface in Position 9. In FIG. 11 the valves 80, 82, 84, 88, 96, and 98 are open, and the valves 86, 90, 92, and 94 are closed. The portion of the branch 132 to the left of the valve 90 is empty or may be in communication with ambient air. The portion of the branch 132 to the right of the valve 90 and the elbow 126 are full of steam which is entering at the valve 96 while condensate is drained at the valve 98. Steam is also being fed via the product dispensing machine outlet 106 to sterilize the machine 35. The tee 124 between the valves 80, 84, and 86 is full of plant cleaning fluid, which is passing from the process line 33 through the valve 80 and through the open drain 112.

FIG. 11 shows the ability to steam sterilize the machine 35 while cleaning the process line 33 and the valve 80 with another cleaning fluid. Yet again, at least two valves in series (here, 86 and 90) are left between the cleaning liquid for the machine 35 and the process line 33, providing extra assurance that one cleaning liquid will not contaminate or react with the other.

Figure 12:
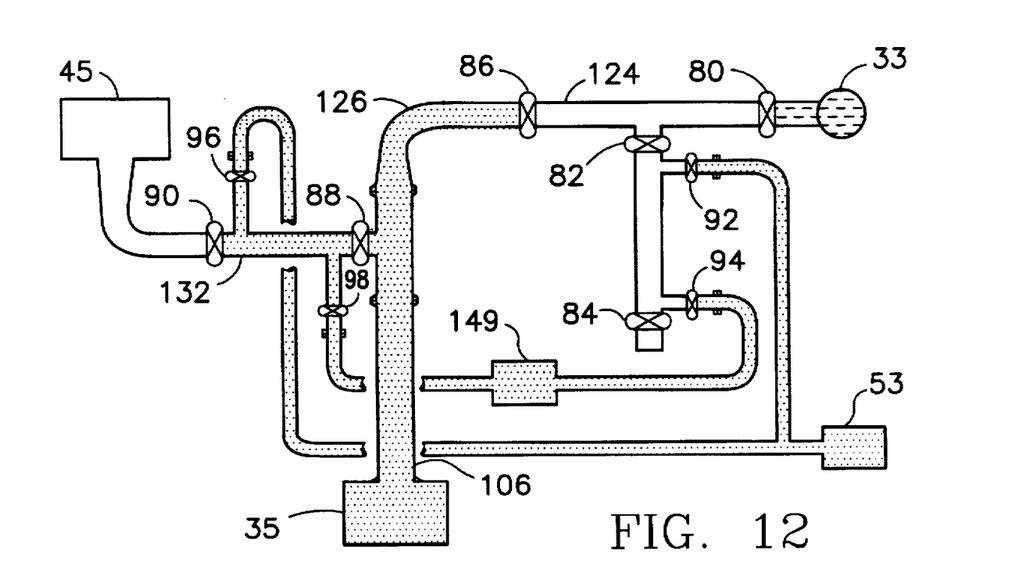
FIG. 12 is a view similar to FIG. 2, showing the valve positions and fluids present in the interface in a tenth state of the interface.

FIG. 12 is a view similar to FIG. 2, showing the valve positions and fluids present in the interface in Position 10. In FIG. 12 the valves 82, 84, 88, 96, and 98 are open, and the valves 80, 86, 90, 92, and 94 are closed. The portion of the branch 132 to the left of the valve 90 is empty or may be in communication with ambient air. The portion of the branch 132 to the right of the valve 90 and the elbow 126 are full of steam which is entering at the valve 96 while condensate is drained at the valve 98. Steam is also being fed via the product dispensing machine outlet 106 to sterilize the machine 35. The tee 124 between the valves 80, 84, and 86 is empty, and the drain valves 82 and 84 are open, while the product is present in the process line 33. The arrangement of FIG. 12 meets the requirement of the 3A standard for an open drain between two valves in series separating cleaning fluids in one part of the apparatus from the product in another part of the apparatus. All parts of the apparatus are also self draining, to avoid puddling of cleaning fluid or the product and subsequent incorporation of the puddled fluid in another fluid.

Figure 13:
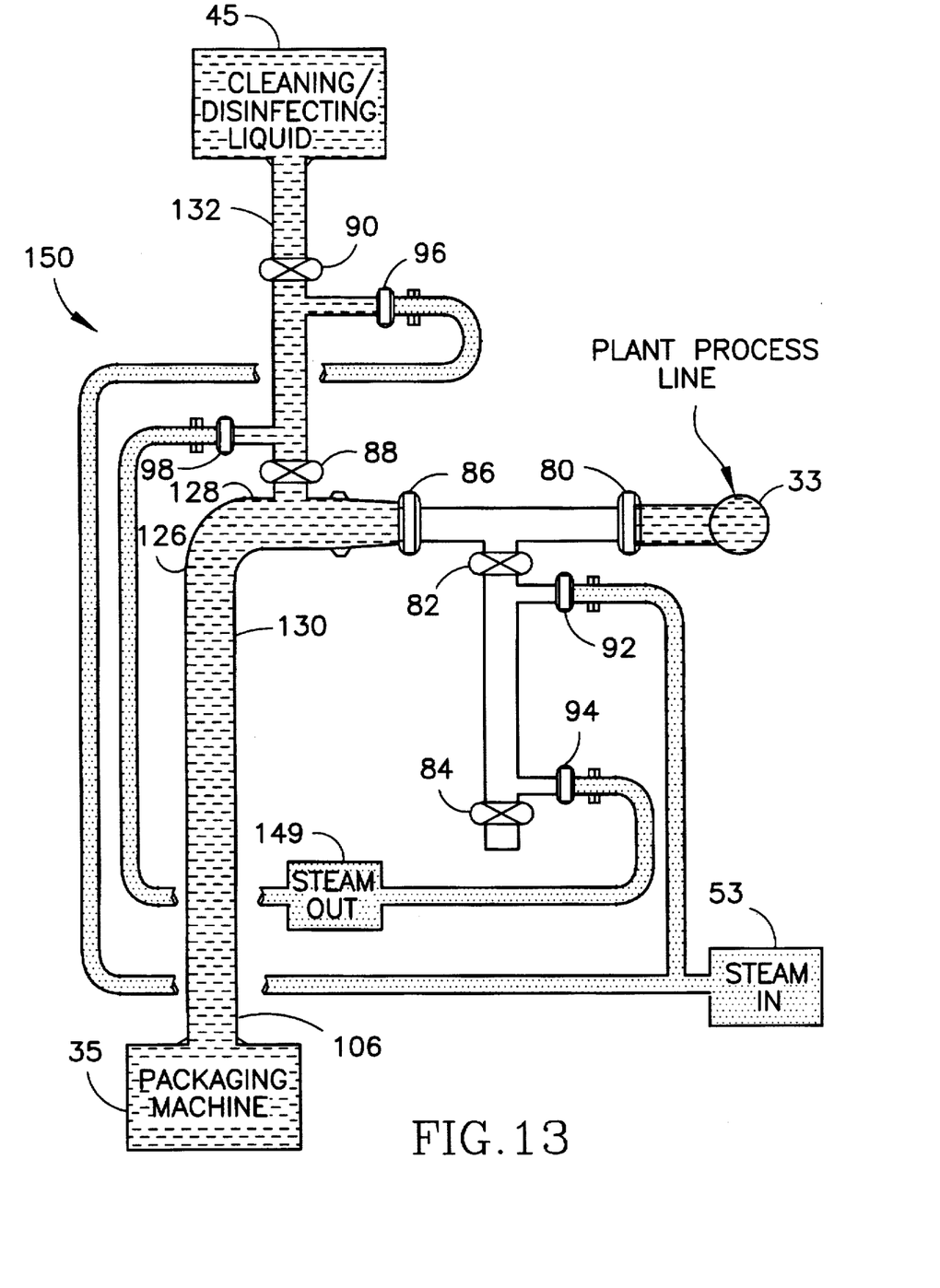
FIG. 13 is a view similar to FIG. 9, showing a second embodiment of the interface in its seventh state.
Figure 14:
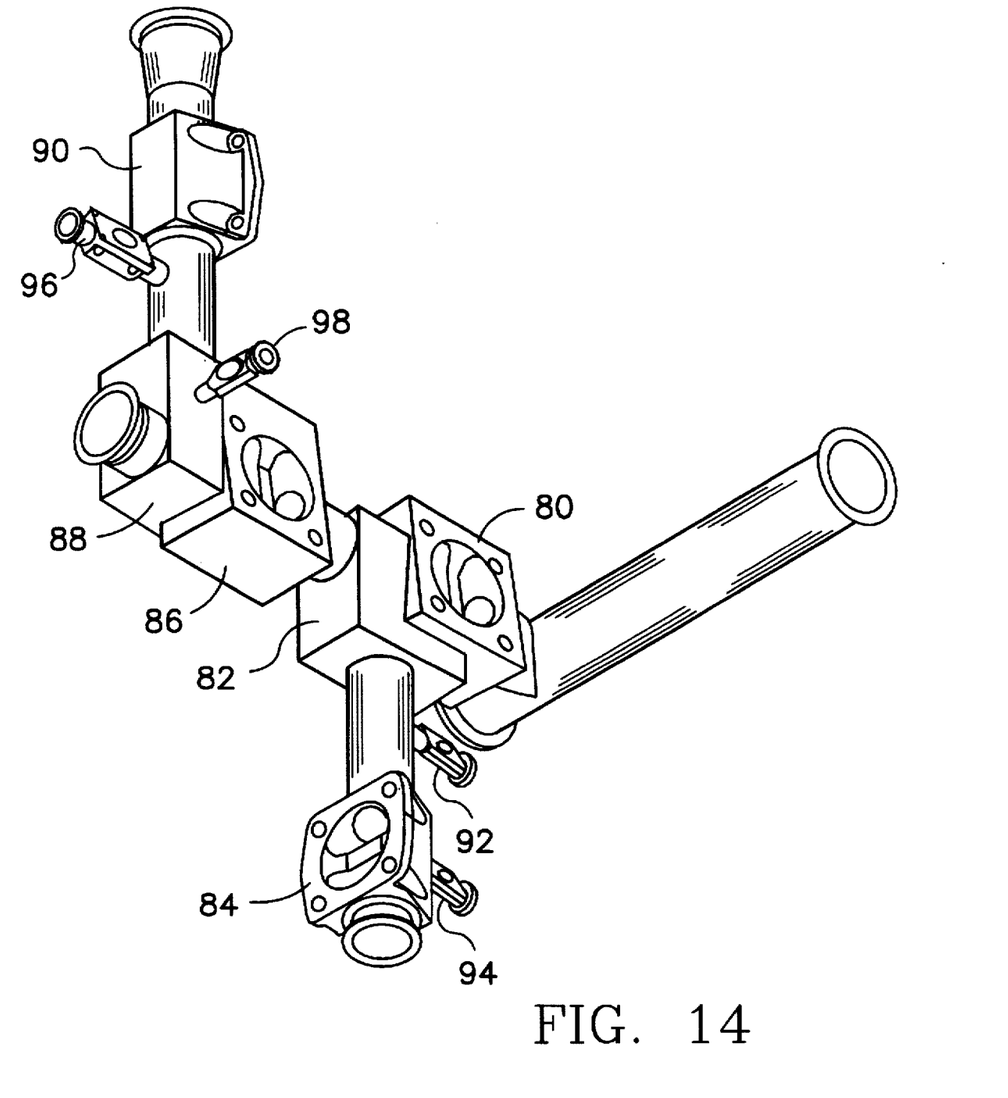
FIG. 14 is a perspective view of the embodiment of FIG. 13, with the valve diaphragms, elements, and operators removed to show the orientation of interior structure.

FIGS. 13 and 14 show a different arrangement of the piping of the interface, here referred to as an interface 150.

In FIG. 13, the interface 150 is configured in Position 7, analogous to FIG. 9. The principal difference in construction of the embodiment of FIGS. 13 and 14 versus FIG. 9 is that the entire branch 132 is vertical, and joins with the generally horizontal first run 128 instead of the vertical second run 130 of the elbow 126.

The advantage of this difference can be demonstrated by comparing the flow of cleaning liquid in FIGS. 9 and 13. In each case, cleaning liquid is being pumped from the source 45 through the valves 90 and 88 and the machine 35. In the interface 61 of FIG. 9, however, the cleaning liquid also must enter the elbow 126, which in this valve configuration is a fairly long dead end. In FIG. 13, the elbow 126 is in the line of flow, both for cleaning liquid introduced from the branch 132 and for product introduced from the process line 33 in a different valve configuration.

Figure 15:
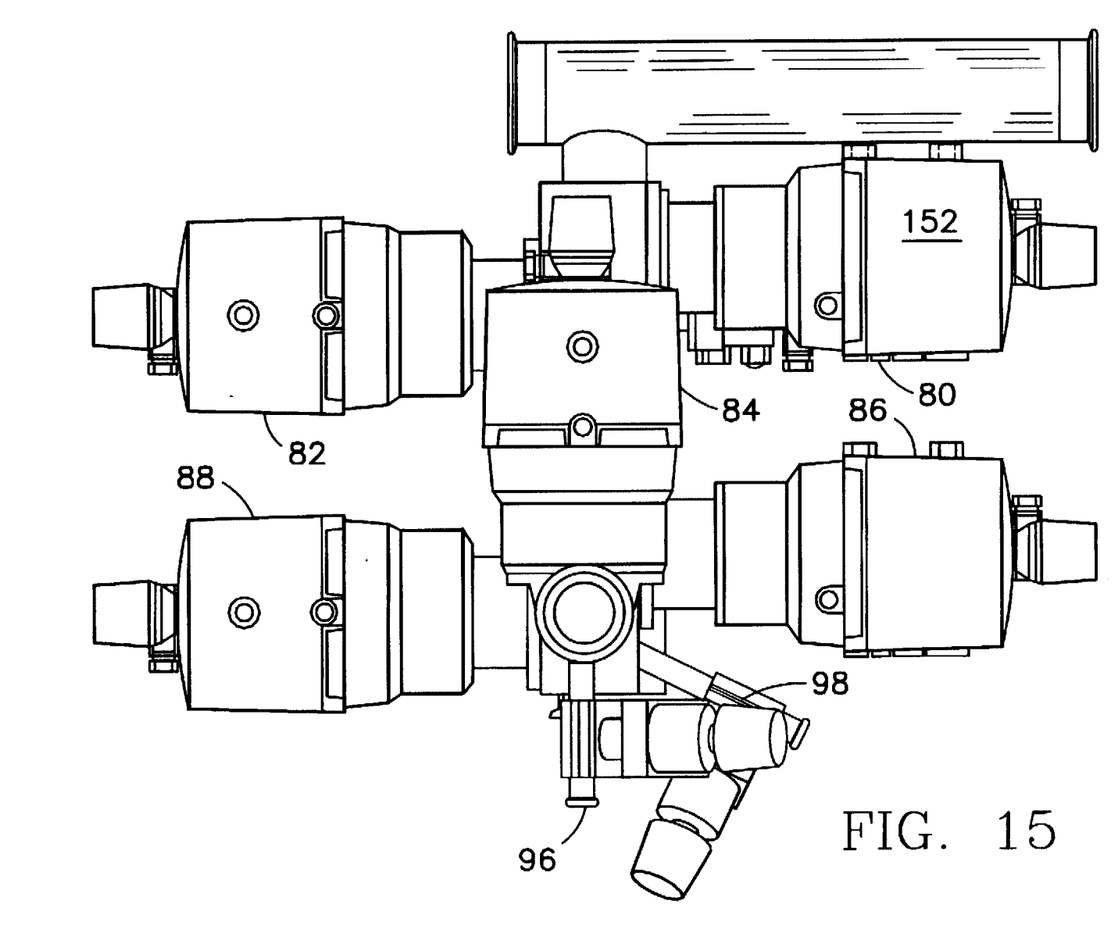
FIG. 15 is a bottom plan view of the embodiment of FIG. 14, showing the valves fully assembled.

Refer now to FIGS. 14 and 15, which show more practical details of the construction of the embodiment of FIG. 13. FIG. 14 illustrates consolidation of several of the valve bodies. This not only saves space and weight, but improves drainage from within the valves and reduces the length of passages between the valves which are sometimes known as blind alleys because they represent areas where material flow can stagnate. Specifically, the valves 80 and 82; 84 and 94; and 86, 88, and 98 are integrated. The respective valves are also oriented so each one will drain properly, which is why the bodies of the valves 80 and 82 or the valves 86 and 88 are tilted relative to each other.

FIG. 15 is a bottom plan view of the embodiment of FIG. 14, showing the valves fully assembled with their valve operators—such as the operator 152 of the valve 80—in place. The valve operators can be conventional.

Figure 18:
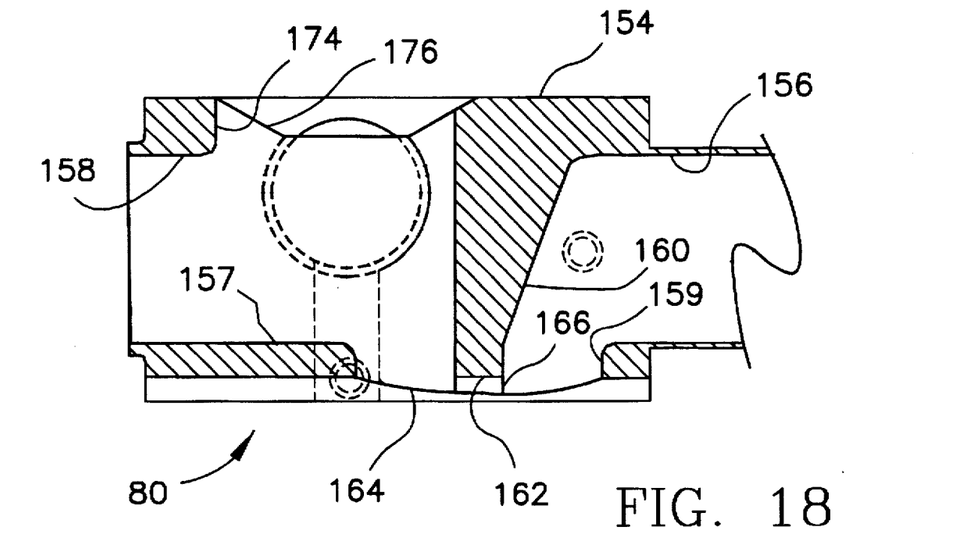
FIG. 18 is a section taken along section line 18—18 of FIG. 16, but modified by adding the valve diaphragm element in its closed position.

Various types of valves can be used within the scope of the present invention. The illustrated valves are diaphragm valves suitable for dairy product piping. The parts of each valve 80–96 are best illustrated by FIG. 18, which is a section through the valve 80. The valve body 154 is a machined, cast, or otherwise formed block of stainless steel or other suitable material. The valve body 154 defines an inlet 156, an outlet passage 157 terminating in an outlet 158, and a diaphragm aperture 159. In this embodiment, the inlet 156 and outlet 158 are at least generally in line. The inlet 156 and outlet 158 are separated by a weir 160 having a seat 162 which faces the diaphragm aperture 159. A diaphragm 164, which here is made of an elastomeric polymer, covers and seals the aperture 159 and supports an integral valve element 166. The diaphragm 164 is flexed perpendicular to its plane by the valve operator (not shown) to bring the valve element 166 into or out of engagement with the seat 162, thus selectively closing or opening the valve 80.

Refer now to FIGS. 16–19, which show further integration of the product valves 80 and 82 and the steam inlet valve 92. The reader will recall by reference to any of FIGS. 2–13 that the valve 80 allows product to enter from the process line 33 en route to the packaging machine 35, while the valve 82 controls access to a drain line 114 which only passes waste fluids. The steam inlet valve 92 provides steam in the drain line 114 and downstream of the valve 80.

Figure 16:
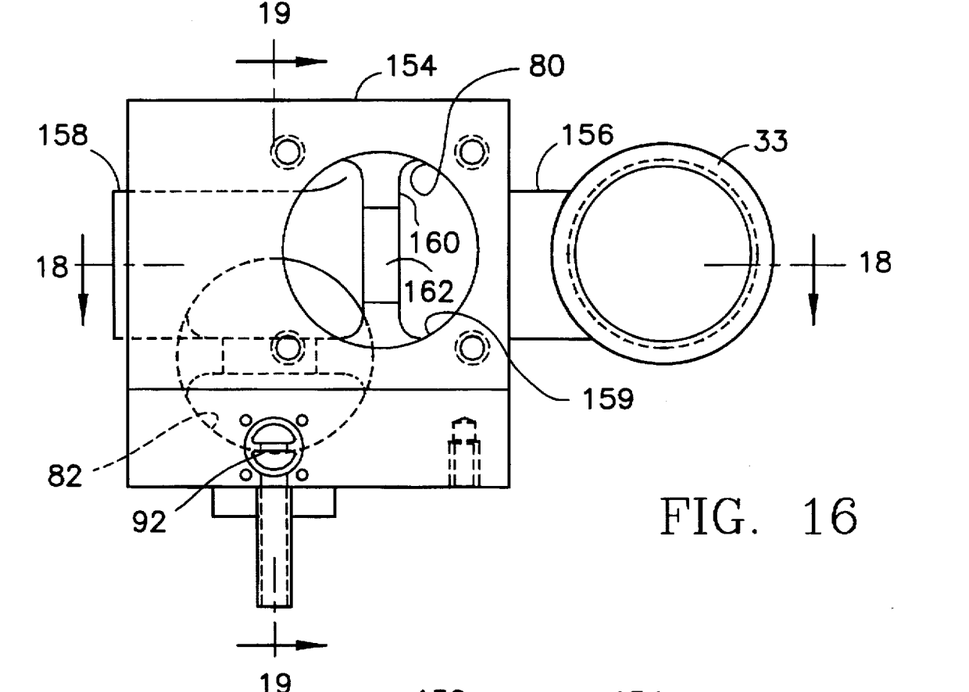
FIG. 16 is an isolated front elevation of an assembly of the valves 80, 82, and 92 similar to FIG. 14, modified to further integrate them. Interior structure is shown by phantom lines.
Figure 17:
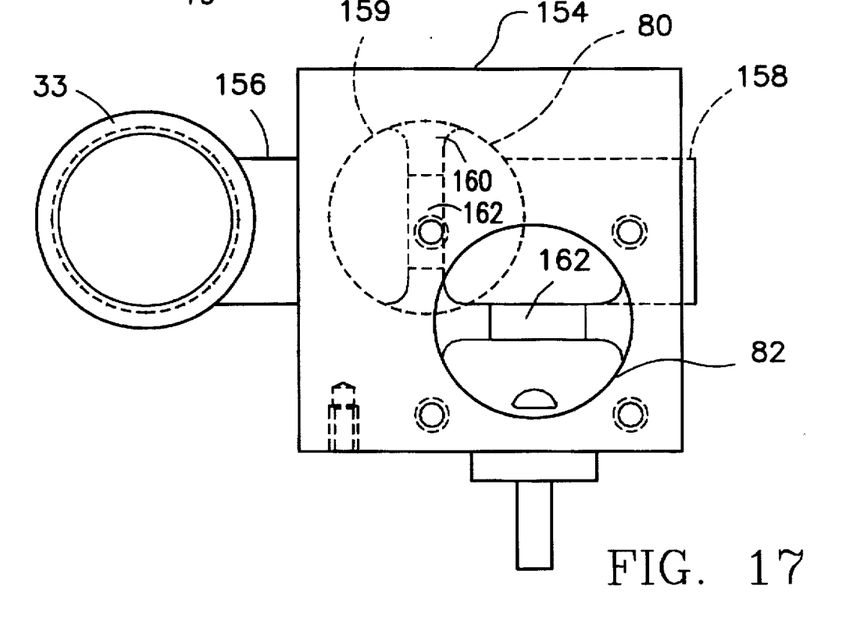
FIG. 17 is a rear elevation of the assembly of FIG. 16. Interior structure is shown by phantom lines.
Figure 19:
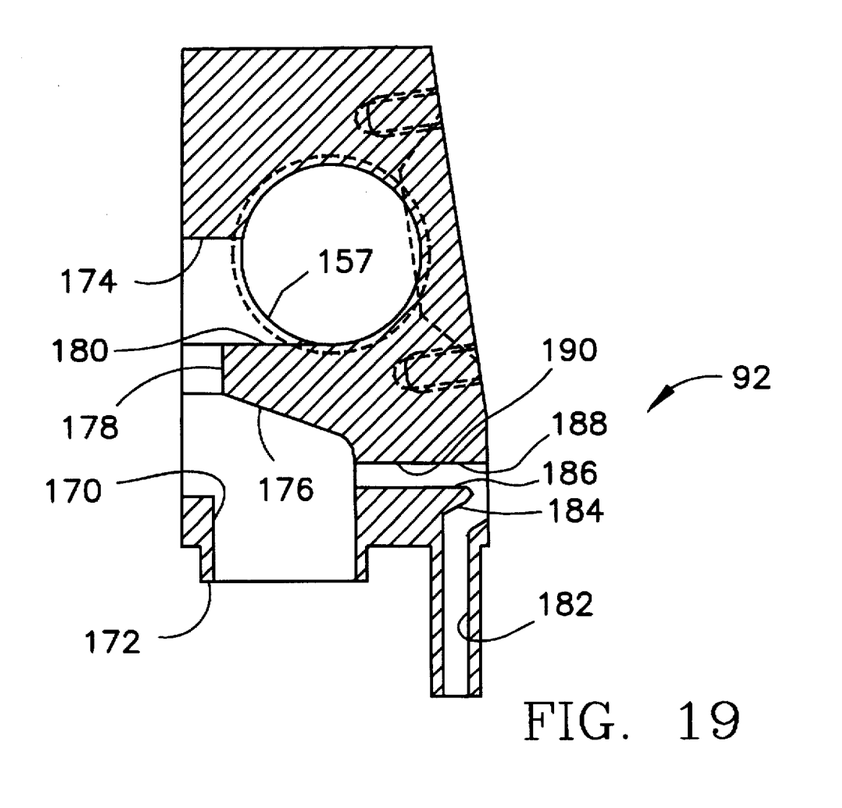
FIG. 19 is a section taken along section line 19—19 of FIG. 16.

Referring to FIGS. 16 and 19, the valve 82 shares the valve body 154 with the valves 80 and 92. The valve 82 has an inlet passage 157 which is also the outlet passage of the valve 80. The valve 82 has an outlet passage 170 terminating in an outlet 172, a diaphragm aperture 174, and a weir 176 having a seat 178. The diaphragm and valve element of the valve 82 are not illustrated in FIGS. 16 and 19, but are equivalent to those elements 164 and 166 of the valve 80.

As is best illustrated in FIG. 19, the weir 176 has an inlet face 180 which also defines a portion of the outlet passage 157. The inlet face is shaped and positioned so it is self-draining over the seat 178 of the weir 176 when the valve 82 is opened. The valves 180 and 182 are oriented orthogonally to facilitate their integration into a self-draining unit with no blind alleys. The outlet 172 empties into the drain line 114, as described previously in connection with FIG. 2 and others.

FIG. 19 also best shows the steam inlet valve 92, which also is a diaphragm valve formed in the valve body 154. The valve 92 has an inlet passage 182, a weir 184, a seat 186, a diaphragm aperture 188, and an outlet passage 190 analogous to the corresponding elements of the valves 80 and 82. The inlet passage 182 is connected to the steam source 53 (see FIG. 2). The outlet passage 190 empties into the outlet passage 170 of the valve 82. The outlet passage 190 is formed and positioned to be self-draining into the outlet passage 170. Again, the diaphragm and valve element are like those of the valve 80, except that if the sterilizing fluid is steam or other fluid at an elevated temperature or pressure, the diaphragm and valve element for the steam inlet valve 92 must be thermally and chemically resistant. The necessary diaphragm materials are known and readily available to those skilled in the art.

Thus, interfaces have been described which have several desirable features. The valves can be arranged and operated to provide at least single-valve isolation at all times between the plant process line cleaning fluid and the machine cleaning fluid. The valves can be arranged to provide at least two valves in series between the lines containing an food product which is suitable for packaging and the machine's cleaning fluid, with an open drain between the two valves, as required by the 3A standard. Alternatively, a steam-filled buffer can be provided between any other fluid and the product when the product is flowing to the packaging machine. The machine therefore is versatile, and can meet either the aseptic processing standards requiring steam buffers or the 3A standard requiring "block and bleed" valve assemblies with drains, at the option of the operator.

I claim:

1. An interface between at least one sanitary product supply vessel, a product dispensing machine, and a cleaning liquid supply vessel, said interface comprising:

A. at least one product inlet adapted for connection to at least one sanitary product supply vessel to receive at least one supply of the sanitary product;

B. at least one product dispensing machine outlet adapted for connection to at least one product dispensing machine;

C. at least one cleaning liquid inlet adapted for connection to at least one cleaning liquid supply vessel for cleaning said interface;

D. at least one first cleaning liquid supply valve having at least one inlet and at least one outlet, of which the outlet is adapted to communicate with said product dispensing machine outlet; and E. at least one second cleaning liquid supply valve having at least one inlet adapted for communicating with said cleaning liquid inlet and at least one outlet adapted for communicating with the inlet of said first cleaning liquid supply valve.

2. The interface of claim 1, further comprising at least one product supply valve having at least one inlet adapted for communicating with said product inlet and at least one outlet adapted for communicating with said product dispensing machine outlet.

3. The interface of claim 2, further comprising at least one isolation valve having at least one inlet adapted for communicating with the outlet of said product supply valve and at least one outlet adapted for communicating with said product dispensing machine outlet.

4. The interface of claim 3, in which at least one inlet of said isolation valve and at least one outlet of said product supply valve define at least one space between said isolation valve and at least one outlet of said product supply valve.

5. The interface of claim 4, further comprising at least one steam inlet and at least one steam outlet adapted for communicating with at least one space between said isolation valve and at least one outlet of said product supply valve for providing a steam buffer between said isolation valve and at least one outlet of said product supply valve.

6. The interface of claim 4, further comprising at least one drain communicating with at least one space between said isolation valve and at least one outlet of said product supply valve.

7. The interface of claim 6, further comprising at least one steam inlet and at least one steam outlet adapted for communicating with at least one space between said isolation valve and at least one outlet of said product supply valve for providing a steam buffer between said isolation valve and at least one outlet of said product supply valve.

8. The interface of claim 6, further comprising at least one drain line extending from said drain to at least one said space between said isolation valve and at least one outlet of said product supply valve.

9. The interface of claim 8, further comprising at least one drain valve in said drain line.

10. The interface of claim 8, further comprising at least first and second spaced drain valves in series in said drain line, wherein the portion of said drain lines between said drain valves defines an isolation space.

11. The interface of claim 10, further comprising at least one steam inlet and at least one steam outlet adapted for communicating with said isolation space for providing a steam buffer between said first and second spaced drain valves.

12. The interface of claim 1, further comprising at least one drain disposed between and adapted to communicate with at least one said product inlet and at least one said product dispensing machine outlet.

13. The interface of claim 1, in which at least one outlet of said first cleaning liquid supply valve and at least one inlet of said second cleaning liquid supply valve define at least one space between said first and second cleaning liquid supply valves.

14. The interface of claim 13, further comprising at least one steam inlet and at least one steam outlet adapted for communicating with said space for providing a steam buffer between said first and second cleaning liquid supply valves.

15. The interface of claim 1, in which each said element is self-draining.

16. The interface of claim 1, in which each said element is Section 3-A compatible.

17. An interface between at least one sanitary product supply vessel, at least one product dispensing machine, and at least one cleaning liquid supply vessel, said interface comprising:

A. at least one product inlet adapted for connection to the sanitary product supply vessel to receive at least one supply of the sanitary product;

B. at least one product dispensing machine outlet adapted for connection to the product dispensing machine;

C. at least one cleaning liquid inlet adapted for connection to the cleaning liquid supply vessel for cleaning said interface;

D. at least one drain;

E. at least one product supply valve having at least one inlet adapted for communicating with said product inlet and at least one outlet;

F. at least one drain valve having at least one inlet adapted for communicating with the outlet of said product supply valve and at least one outlet adapted for communicating with said drain;

G. at least one drain isolation valve having at least one inlet adapted for communicating with the outlet of said product supply valve and at least one outlet adapted for communicating with said product dispensing machine outlet; and H. at least one cleaning liquid supply valve having at least one inlet adapted for communicating with at least one said cleaning liquid inlet and at least one outlet adapted for communicating between at least one outlet of said drain isolation valve and at least one said product dispensing machine outlet.

18. The interface of claim 17, further comprising a second drain valve in series with and spaced from said first drain valve, wherein the space between said drain valves defines an isolation space.

19. The interface of claim 18, further comprising at least one steam inlet and at least one steam outlet adapted for communicating with said isolation space for providing a steam buffer between said first and second spaced drain valves.

20. The interface of claim 17, in which each said element is self-draining.

21. The interface of claim 17, in which each said element is Section 3-A compatible.

* * * * *